April 22, 1969   L. MENDELSON   3,439,628
TROLLEY CONTAINER
Filed July 1, 1966   Sheet 1 of 2

INVENTOR.
LAVINE MENDELSON
BY
Dominik, Stein & Knechtel
ATTY.

INVENTOR.
LAVINE MENDELSON
BY
Dominik, Stein & Knechtel
ATTY.

United States Patent Office 3,439,628
Patented Apr. 22, 1969

3,439,628
TROLLEY CONTAINER
Lavine Mendelson, 4915 Kelly Road,
Tampa, Fla. 33615
Filed July 1, 1966, Ser. No. 562,208
Int. Cl. B61b 7/06
U.S. Cl. 105—50                                     10 Claims

ABSTRACT OF THE DISCLOSURE

A trolley capable of carrying an object, such as film, having a two-speed drive and switch means to automatically vary said drive speed whereby said trolley can deliver said object at a fast speed and return it at a slower speed to the starting point to conserve power.

---

This invention relates to trolleys, and in particular, to trolleys which are adapted to rapidly deliver an object from one point to another, to automatically deposit the object at the latter point, to reverse its path of travel, and to stop upon return to its initial starting point.

There is currently a need at race tracks, for example, for delivering to a dark room undeveloped photographic film from the various observation towers around the track. The dark room is generally located atop the grandstand where the judges are located. There is also a need to deliver objects between spaced points, such as in plants, offices and the like.

For race track use, the trolley must have a compartment for securely retaining the film, and must be able to rapidly traverse the distance between the camera and the film laboratory so that the results can be determined with the least delay possible.

Accordingly, it is an object of the present invention to provide a trolley for transporting an object from one point to another.

Another object is to provide a trolley for rapidly transporting an object from one point to another, which is adapted to automatically reverse its path of travel to return to its starting point.

Still another object is to provide a trolley of the above described type which is adapted to automatically deposit an object at the terminal point, before reversing its path of travel.

A further object is to provide a trolley for transporting an object from one point to another which is a self-contained unit, having a rechrageable source of power. It is further contemplated that the trolley have a single motor which is reversible in direction of operation, and that the source of power be adapted to operate the motor at both a fast and a slow speed.

Other objects of the invention will in part be obvious and will in part appear hereinafter.

The above objectives are accomplished with a trolley which includes, generally, a rotatable drive wheel, a reversible electric motor for driving said drive wheel, and rechargeable batteries or power packs for supplying power to the motor. Switching means are provided to either couple the batteries in series or in parallel with the motor to drive it, and hence the trolley, in a forward direction at a fast speed and in the opposite direction at a slower speed, respectively. Upon returning to its starting point, the switching means are operated to stop the travel of the trolley. A compartment is provided for carrying an object, and it has a door which is automatically opened by a release mechanism that is operated upon arrival at the terminal point. The release mechanism upon being operated to open the compartment also functions to operate the switching means to reverse the trolley's direction of travel and to change its speed of travel.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings in which.

Similar reference characters refer to similar parts throughout the several views of the drawings.

Figure 6:
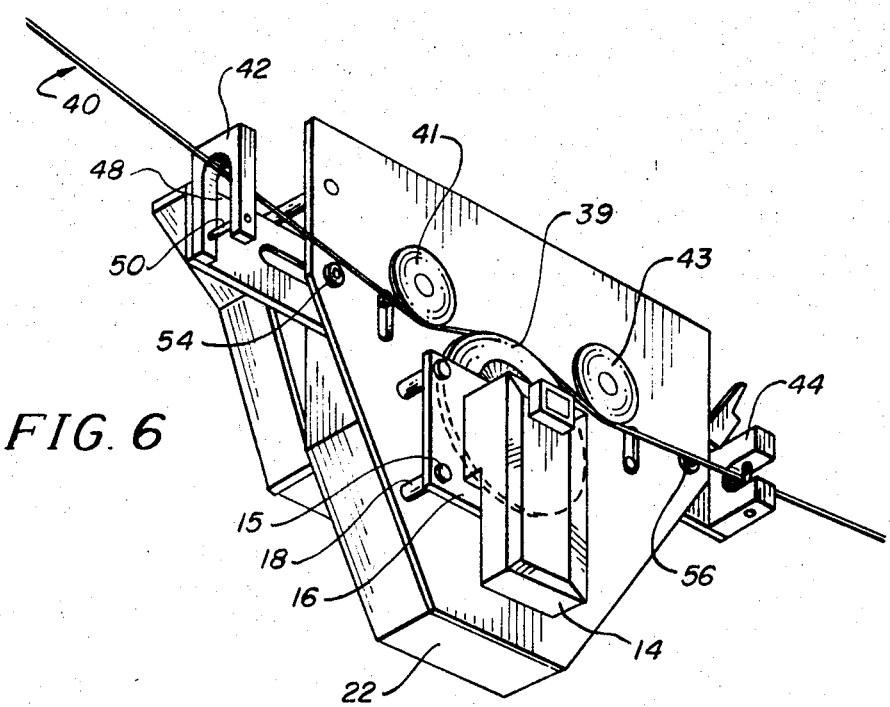
FIG. 6 is a perspective view illustrating the trolley of FIG. 1 traveling on a trolley wire.

Referring now to the drawings, a trolley 10 exemplary of the invention is illustrated having a flat support plate 12 which may have a shape substantially resembling a truncated triangle, as illustrated. The support plate 12, however, can assume any one of a number of different shapes, such as, square, rectangular and even circular. A motor 14 which is preferably a reversible D-C electric motor is affixed to one side of the support plate 12, by means of fastener means such as the threaded bolts 15 extended through a motor mounting plate 16. Spacers 18 (FIG. 6) may be provided between the motor mounting plate 16 and the support plate 12 for mounting the motor 14 in spaced relation to the support plate 12.

Figure 5:
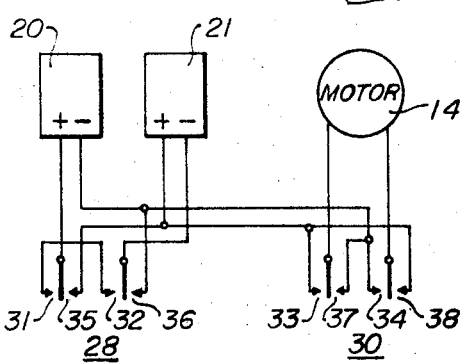
FIG. 5 is a schematic diagram of the electrical circuitry of the trolley.

A pair of stored power sources 20 and 21 illustrated schematically in FIG. 5 are affixed to the opposite side of the support plate 12 and are retained within a box-like enclosure 22 which functions both to conceal and to protect them. The stored power sources 20 and 21 are preferably rechargeable 6-volt batteries or 6-volt power packs, such as Catalogue No. 66701 power packs by the General Electric Company.

The batteries of power packs 20 and 21 are electrically coupled to the motor 14 by means of conductors 26 and a pair of switches 28 and 30 illustrated schematically in FIG. 5 and concealed within the enclosure 22. In FIG. 5, with the switches 28 and 30 in position illustrated, the battery or power packs 20 and 21 are disconnected from the motor 14 so that the motor 14 is not energized. If the switches 28 and 30 are operated to close their respective contacts 31, 32 and 33, 34, it can be seen that the batteries or power packs 20 and 21 are connected in series with one another and with the motor 14. Alternatively, when the switches 28 and 30 are operated to close their respective contacts 35, 36 and 37, 38, it can be seen that the batteries or power packs 20 and 21 are connected in parallel with the motor 14 and that the current flow through the motor 14 is in an opposite direction. Accordingly, the switches 28 and 30 can be operated to energize the motor 14 to drive the trolley 10 in either a forward or backward direction, and in a fashion such that the rate of travel in the forward direction is much faster than it is in the opposite direction.

Figure 1:
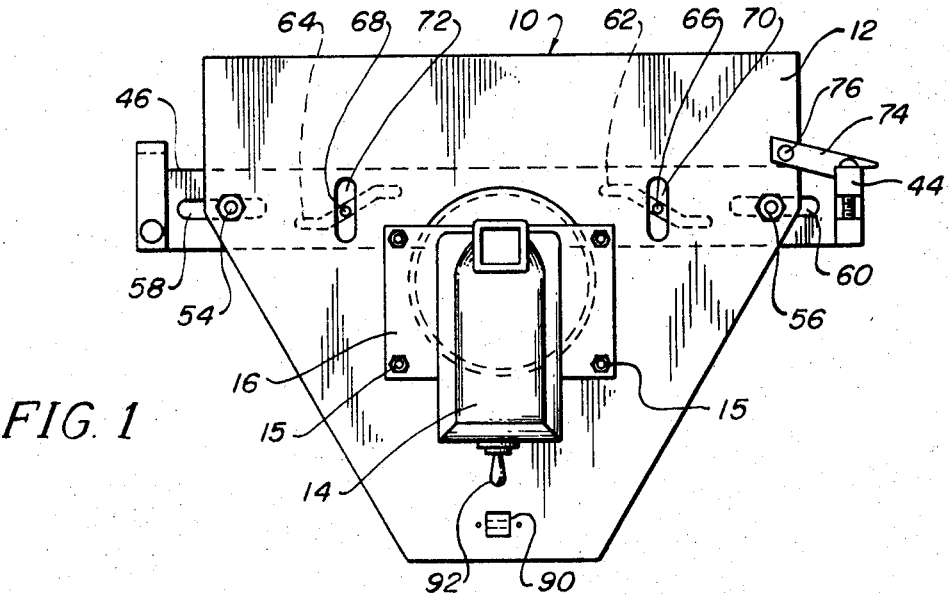
FIG. 1 is a plan view of one side of a trolley exemplary of the invention.

A drive wheel 39 is drivingly coupled to the motor 14 and is rotatably supported by the support plate 12 and by a wall 16 (FIG. 1). A pair of supporting wheels 41 and 43 are rotatably mounted in spaced relation and on opposite sides of the drive wheel 39 so that a trolley wire 40 (FIG. 6) can be threaded between the three wheels 39, 41 and 43 to drivingly support the trolley in the illustrated manner. It can be seen that the supporting wheels 41 and 43 forcibly urge the trolley wire to loop about a portion of the top of the drive wheel 39 so that a good driving contact is made with the drive wheel 39.

The trolley 10 also is supported and retained on the trolley wire 40 by means of a pair of brackets 42 and 44 affixed to the opposite ends of a lever 46. The brackets 42 and 44 each have a substantially U-shaped guide slot 48 therein for the trolley wire 40 and a locking pin 50 removably secured across the open end of the guide slot. The trolley 10 is mounted on the guide wire 40 by removing the locking pins 50 so that the trolley wire can be engaged within the guide slots 48 and the locking pins are then replaced to effectively secure the trolley wire therein. The peripheral edges of the drive wheel 39 and the supporting wheels 41 and 43 are preferably formed with a recess therein which substantially corresponds to the contour of the trolley wire so that the trolley wire rides and is secured within a track formed in their peripheral edges.

The lever 46 is slidably affixed to the support plate 12 by means of fastening means such as the threaded bolt assemblies 54 and 56 extended through the support plate 12 and respective ones of a pair of elongated slots 58 and 60 formed in the lever 46. The lever 46 also has a pair of cam slots 62 and 64 formed in it in spaced relation. The cam slot 62 is substantially Z-shaped while the cam slot 64 is a mirror image of it.

A pair of toggle switches 66 and 68 for operating the switches 28 and 30 are confined within a pair of elongated vertically disposed guide slots 70 and 72 formed in the support plate 12 and extend through respective ones of the cam slots 62 and 64. With this arrangement, it can be seen that the toggles 66 and 68 are operated up and down along a vertical axis when the lever 46 is moved transversely with respect to the support plate 12. Also, it can be seen that the toggles 66 and 68 are operated in opposite directions when the lever 46 is moved transversely since the cam slots 62 and 64 in which they are engaged are mirror images of one another. Accordingly, the switches 28 and 30 are mounted so that the contacts 31 and 32 of switch 28 are closed when the contacts 33 and 37 of the switch 30 are opened, and vice versa.

Figure 3:
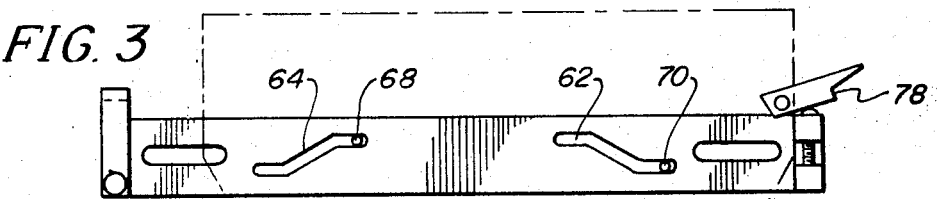
FIG. 3 is a partial view illustrating the cam operating lever in its operative position for rapid trolley travel.
Figure 4:
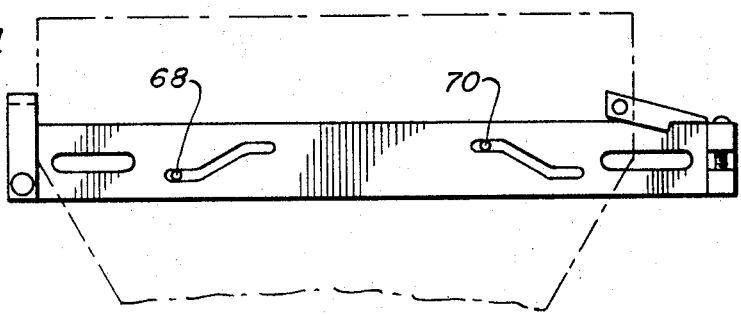
FIG. 4 is a partial view illustrating the cam operating lever in its operative position for slower reverse trolley travel.

In FIGS. 1, 3, and 4, the lever 46 is illustrated in positions such as to operate the switches 28 and 30 to de-energize the motor 14, to energize the motor for forward travel and to energize the motor for reverse travel, respectively. A lock 74 in the form of a lever arm is pivotally affixed by means of a pivot pin 76 at its one end to the support plate 12. A stop 78 (FIG. 3) in the form of a notch is provided in the opposite end of the lock 74 and is adapted to engage the bracket 44 affixed to one end of the lever 46, as illustrated in FIG. 1. In operation, the lock 74 is manually raised and the lever 46 is pushed transversely to the left, as illustrated, to close contacts 31 and 32 of switch 28 and contacts 33 and 34 of switch 30 to energize motor 14 for fast forward travel which, as is illustrated, is to the left. The lock 74 rests atop the bracket 44 during the forward travel, as illustrated in FIG. 3. When the trolley reaches the terminal point, a stop (not shown) is provided which is engaged by the left end, as illustrated, of the lever 46, and the momentum of the trolley 10 causes the lever 46 to be moved transversely to the right with respect to the support plate 12, as illustrated in FIG. 4. This movement of the lever 46 operates the toggles 66 and 68 to close the contacts 34 and 35 of switch 28 and contacts 36 and 37 of the switch 30. As indicated above, closure of these contacts energizes motor 14 for rotation in the opposite direction so that the trolley 10 reverses its direction of travel and returns to the starting point. Also, on the return travel, only the batteries or power packs 20 and 21 are connected in parallel with the motor 14 so that the motor travels more slowly. Another stop is provided at the starting point in a position so as to be engaged by the right end, as illustrated, of the lever 46 so that the momentum of the trolley 10 causes the lever 46 to be again shifted to the left when the lever 46 engages the stop. The lock 74 drops to a preset position when the lever 46 is moved to the extreme right with respect to the support plate 12, as illustrated in FIG. 4, so that the bracket 44 engages the stop 78 when the lever 46 is moved to the left, as illustrated in FIG. 1. Therefore, when the bracket 44 strikes the stop 78, both the switches 28 and 30 are opened, to de-energize the motor 14.

Figure 2:
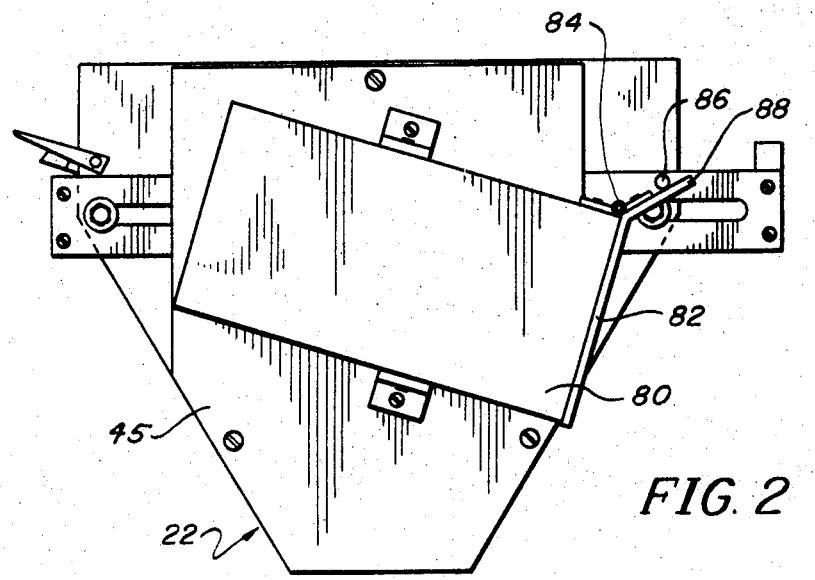
FIG. 2 is a plan view of the opposite side of the trolley of FIG. 1.

A compartment 80 for carrying an object such as a roll of photographic film is affixed to the wall 38 of the enclosure 22 and has a door 82 which can be opened by inertial action pivotally affixed by means of a pivot pin 84 to it to close its open end. The compartment 80 may be substantially horizontally disposed or, alternatively, it can be positioned so that its open end is disposed downwardly at an angle of approximately 15°, as illustrated. A door lock in the form of a pin 86 is affixed at its one end to the lever 46 and in a position so as to engage an angularly disposed extension 88 of the upper end of the door 82 when the lever 46 is moved to the extreme right, as illustrated in FIG. 2, or when moved to the extreme left in FIG. 1. The engagement of the pin 86 with the extension 88 holds the door 82 in a closed position so that an object is securely retained within the compartment 80. With this arrangement, when the lever 46 strikes the stop at the terminal point and is slidably moved to reverse the direction of travel of the trolley (to the left in FIG. 2), the pin 86 is also disengaged from the extension 88 of the door 82 and the door 82 pivots open due to its inertia, when the trolley reverses its direction of travel. The object retained therein will drop out of it for the same reason. Having the compartment 80 angularly disposed, as illustrated, will assist in causing the object to spill out of the compartment.

From the above description, it can be seen that the trolley 10 is adapted to rapidly deliver an object from one point to another utilizing a single cable as its track, to automatically deposit the object at the latter point, to reverse its path of travel, and to stop upon return to its initial starting point. Accordingly when used at for example, a race track, a single cable is stretched from the observation tower to the dark room. The undeveloped photographic film at the tower may then be placed within the compartment 80, the lock 74 raised and the lever 46 moved transversely to the left with respect to the support plate 12, as illustrated in FIG. 1, to energize the motor 14 for rapid forward travel to the dark room. Movement of the lever 46 in the described manner also functions to "lock" the door 82 for the compartment 80 so that the film is securely retained therein. Upon arrival at the dark room, the lever 46 engages a stop and is caused to be shifted transversely to the right with respect to the support plate, as illustrated in FIG. 4, thereby causing the trolley to reverse its direction of travel but at a slower rate to conserve battery power and to release the door 82 to permit the film therein to be deposited at the dark room, all automatically. Upon return to the starting point, the lever 46 again engages a stop and moves until the bracket 44 affixed thereto engages the stop 78 of the lock 74 to open the switches 28 and 30 to de-energize the motor 14.

A socket 90 may be advantageously provided for coupling means to the trolley for recharging the batteries or power packs 20 and 21. Also, a switch 92 may be provided for disconnecting the batteries or power packs 20 and 21 from the electrical circuitry when the trolley is not in use, to prevent it from being accidentally operated.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which as a matter of language, might be said to fall therebetween.

Now that the invention has been described, what is claimed as new and desired to be secured by Letters Patent is:

1. A trolley adapted to travel upon a rail or wire between a starting point and a terminal point, said trolley having a container for carrying lading comprising: a drive wheel, reversible motor means drivingly coupled to said drive wheel, a source of power coupled to said motor means, switching means connected between said source of power and said motor means whereby said motor means is energized in one direction and subsequently energized in an opposite direction and then de-energized to drive said trolley in one direction at a fast speed and in another direction at a slower speed.

2. The trolley of claim 1 wherein said motor means comprises an electric motor and wherein the source of power comprises stored power means.

3. The trolley of claim 2 wherein said stored power means comprises at least two rechargeable power packs.

4. The trolley of claim 1 further including slide lever means coupled to and adapted to operate said switching means, said slide lever means having a first operable position for operating said switch means to disconnect said source of power from said motor means, a second operable position for operating said switch means to couple said source of power to said motor to drive said motor in said one direction at a fast speed and a third operable position for operating said switch means to couple said source of power to said motor to drive said motor in another direction at a slower speed.

5. The trolley of claim 4 wherein said slide lever means is automatically operated from said second operable position to said third operable position and from said third operable position to said first operable position upon engaging stop means at the terminal and starting points, whereby said trolley upon traveling from said starting point to said terminal point is automatically reversed in its direction of travel and upon arriving at the starting point its travel is stopped.

6. The trolley of claim 5 further including lock means automatically operated to lock said slide lever means to thereby prevent said slide lever means from being operated from said third operable position to said second operable position upon engaging said stop means at the starting point.

7. The trolley of claim 4 wherein said container for carrying lading comprises a closed compartment having a door which can be opened and wherein said slide lever means is further adapted to lock said door in a closed position when said slide lever means is in its second operable position and to permit said door to be opened when in its third operable position.

8. The trolley of claim 7 wherein said compartment's door is adapted to be opened by inertia, whereby an object carried therein is automatically deposited at said terminal point when said slide lever means engages said stop means at said terminal point.

9. The trolley of claim 1 wherein said motor means comprises an electric motor and wherein said source of power comprises at least two rechargeable stored power sources, said switching means including a pair of switches, conductor means coupling said stored power sources, said electric motor and said pair of switches in a fashion such as to disconnect said power sources from said electric motor when said switches are in a first position, to connect both of said stored power sources in series with said electric motor to operate it in one direction in a second position, and to connect both of said stored power sources in parallel with said electric motor to operate it in the opposite direction in a third position.

10. The trolley of claim 9 wherein each of said pair of switches include a toggle actuator for operating said switches, said trolley further including slide lever means having a pair of cam slots therein, said slide lever means being slidably affixed to said trolley and positioned to operatively receive said toggle actuators in respective ones of said cam slots, whereby said slide lever means upon engaging stop means at said terminal point is slidably positioned to operate said switches to said third operable position and is slidably positioned to operate said switches to said first operable position upon engaging stop means at said starting point.

References Cited

UNITED STATES PATENTS

| | | | |
|---|---|---|---|
| 611,778 | 10/1898 | Entz | 307—50 |
| 1,115,207 | 10/1914 | Kelsey | 105—50 |
| 1,206,493 | 11/1916 | Wulferding | 105—50 |
| 3,238,895 | 3/1966 | Oswald | 105—50 X |

ARTHUR L. La POINT, *Primary Examiner.*

H. BELTRAN, *Assistant Examiner.*

U.S. Cl. X.R.

105—51, 150